July 7, 1964 V. L. KIPPING 3,139,790
PHOTOGRAPHIC APPARATUS MECHANISM
Filed Feb. 20, 1961 3 Sheets-Sheet 1

INVENTOR.
Vernon L. Kipping
BY Julian Caplan
attorney

INVENTOR.
Vernon L. Kipping

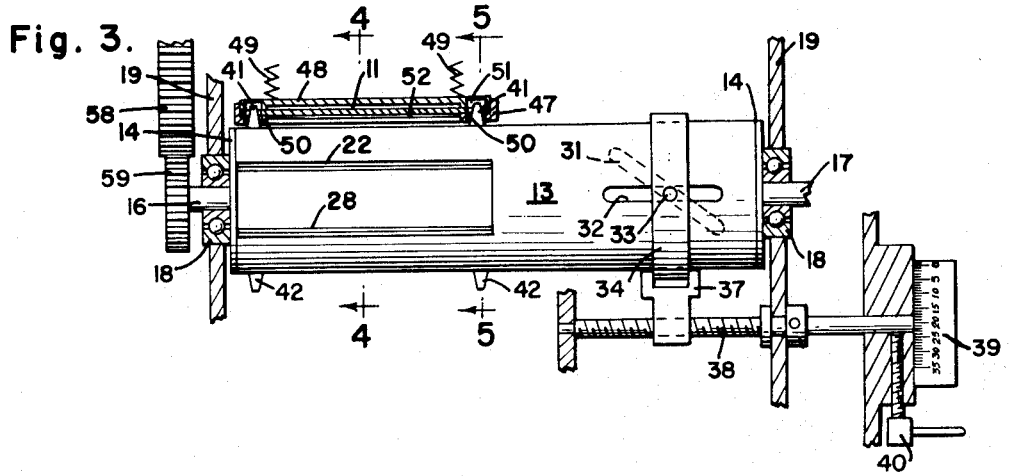

United States Patent Office 3,139,790
Patented July 7, 1964

3,139,790
PHOTOGRAPHIC APPARATUS MECHANISM
Vernon L. Kipping, 540 Melrose Ave.,
San Francisco 12, Calif.
Filed Feb. 20, 1961, Ser. No. 103,668
6 Claims. (Cl. 88—19.3)

This invention relates to a new and improved mechanism for actuating photographic shutter, varying shutter aperture width and advancing film.

Conventional cameras and projectors comprise a number of elements, at least two of which are mechanically actuated. One such mechanically actuated element is the shutter which opens and closes to establish or close off communication between a light source and the film. The other such mechanically actuated element advances the film from one frame to the next while the shutter is closed. The mechanisms heretofore described are among the most complicated in cameras and projectors, particularly in motion picture equipment where the present invention finds its most ready application. Such mechanisms require accurate means for synchronizing the opening and closing of the shutter with the film advancement since otherwise the picture is destroyed. Fairly complex mechanical movements have heretofore been used in such installations. Further, such mechanisms generally create most of the maintenance and repair problems for photographic equipment of the general type. Additionally, the power required to actuate the mechanism is considerable because of the intermittent movement of the mechanical elements (as well as the film itself) and the friction between the various moving parts.

The present invention essentially consists of a rotating cylinder having diametrically opposed slots which rotate about an axis in such manner that when the slots are aligned between the film and a light source there is communication between the film and the light source, but when the cylinder is rotated a sufficient angle the communication is interrupted and hence the cylinder functions as a shutter. The periphery of the cylinder also carries one or more sprocket pins engageable with the sprocket holes in the film. The sprocket pin is so positioned and dimensioned that as the cylinder revolves and while the shutter is closed the pin engages a sprocket hole and advances the film one frame.

From the foregoing brief description it will be seen that the shutter and film advance consists of a single element which, in the case of a motion picture projector or camera, may be caused to rotate continuously rather than intermittently and thus a greatly simplified mechanical movement is provided. The initial cost is less than that of separate mechanisms. Maintenance and repair problems are also reduced because of the simplification of the structure. Although in cameras of the conventional type intermittent movement of the film is essential, the present invention does not employ any other intermittent movement. Thus the power requirements of the apparatus are reduced in that stopping and starting of moving parts and the frictional losses entailed therein are eliminated. Reduction in power requirements is of importance in certain installations, such as battery-driven cameras and spring motor cameras.

Accordingly, it is a principal object of the present invention to provide a mechanical device which combines the function of a shutter and a film advance mechanism thereby greatly simplifying the mechanism of cameras and projectors. Cost of manufacture as well as of maintenance is thus reduced and the dependability of the device is increased by reason of the reduction in component parts.

A further feature of the invention is the provision of means for varying the shutter width. Thus as an elaboration of the foregoing described simple mechanism there may be provided a second cylinder inside the first which is likewise provided with diametrically aligned slots and means is provided for angular rotation of the inner cylinder relative to the outer cylinder about the axis of rotation thereof. When the slots of the two cylinders are in registry the aperture is at its maximum opening. However, relative rotation of the two cylinders reduces the opening and thus decreases the shutter opening. Variable shutters are used principally on cameras and provide a means for controlling shutter speed of cameras as well as means to effect fade-in and fade-out of a scene.

In the following description the present invention is illustrated applied to simple projectors and cameras. It will be understood, however, that the invention may be incorporated in more elaborate equipment if desired. Further, although the invention is described with reference to motion picture apparatus, it will be understood that the driving means may be discontinuous as in the case of still photography, but the invention may be used to open and close the shutter and advance the film in sequence.

Other objects of the present invention will become apparent upon reading the following specification and referring to the accompanying drawings in which similar characters of reference represent corresponding parts in each of the several views.

In the drawings:

FIG. 3 is a fragmentary horizontal section of the shutter and film advance mechanism and associated mechanical elements taken substantially along line 3—3 of FIG. 2, with the shutter cylinder rotated 90°.

Figure 1:
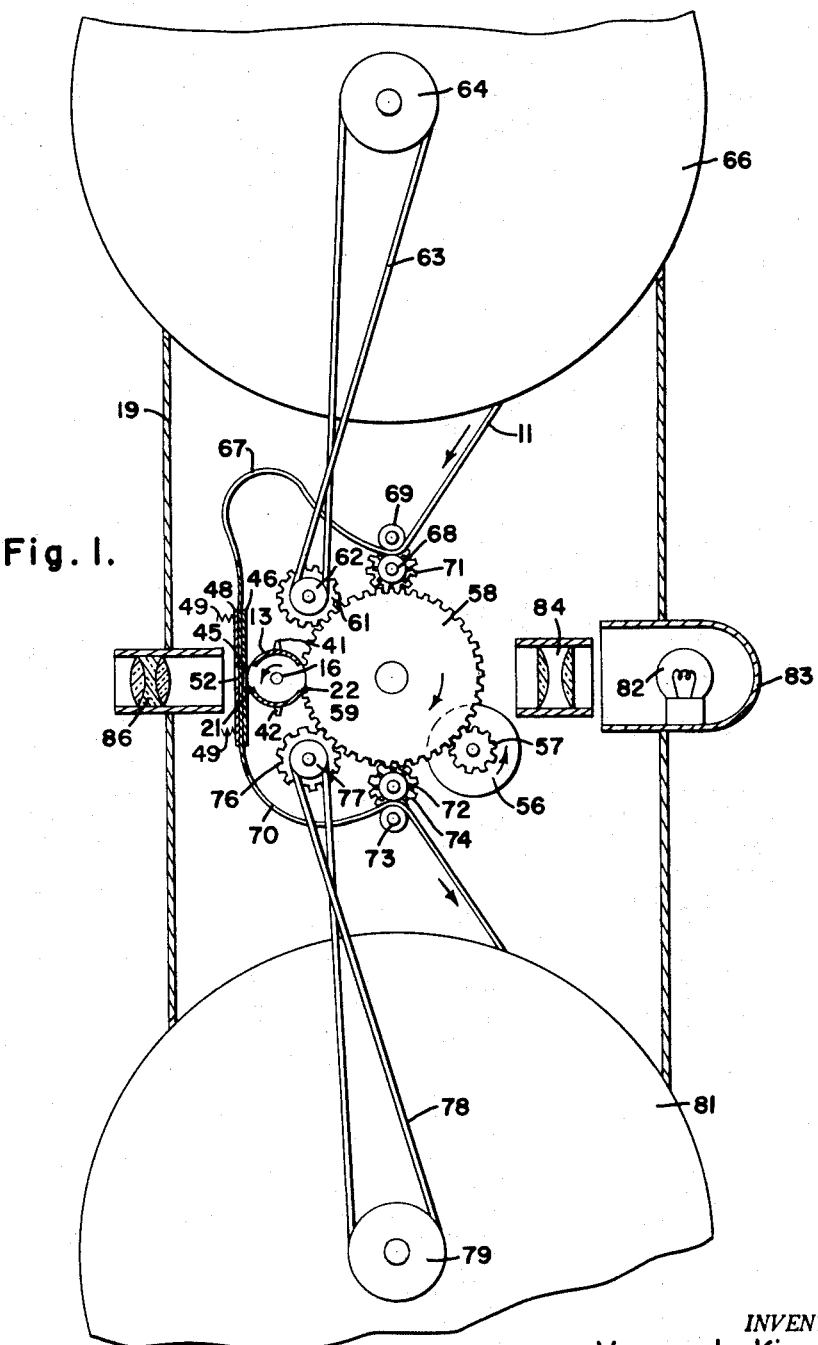
FIG. 1 is a schematic vertical section through a motion picture projector in which this invention is installed.

FIGS. 4 to 6 are schematic views showing different positions of the film advance cycle, FIG. 6 showing the shutter aperture partially closed. FIG. 4 is taken substantially along line 4—4 of FIG. 3. FIGS. 5 and 6 are taken substantially along line 5—5 of FIG. 3.

FIG. 7 is a schematic rear elevation of a modification.

FIG. 8 is a side elevation of the structure of FIG. 7.

The present invention, as has been stated, may be used either in a projector or in a camera. Either such apparatus requires that the film 11, which is here shown as ordinary motion picture film having sprocket holes 12 spaced along at least one edge, be advanced a fixed distance or "frame" and that such advance be intermittent and more specifically that the advance occur when the shutter is closed. In the case of a camera, the shutter is interposed between the film and the lens structure which focuses the scene being photographed upon the plane of the film to record a film frame. In the case of a projector, the shutter is interposed between the light source and the film. The present invention is applicable to either such installation, it being hereinafter shown in detail how the shutter and film advance may be located on either side of the film.

The essential element of the device consists of a hollow cylinder 13 made of sheet metal, extruded tubing, or the like, having closures 14 at either end to which are attached short shafts 16, 17 received in bearings 18 mounted in the casing 19 of the apparatus. Cylinder 13 is formed with a pair of diametrically opposed slots 21, 22, having a chordal width at least equal to one frame of the film 11. For each revolution of the cylinder 13 the shutter is opened and closed twice, namely, once when the first slot 21 is in proximity to the film and secondly when the other slot 22 is in proximity to the film. The shutter remains open so long as the two slots 21, 22 are aligned with the light source (FIG. 4), but as soon as the leading edge of one slot overlaps the leading edge of the other slot between the film and the light source (FIGS. 5 and 6) the shutter is closed.

Shutter opening where desired may be controlled by means of a second cylinder 26 inside cylinder 13 and rotatable relative thereto about the axis of shafts 16, 17. Inner cylinder 26 likewise has a pair of slots 27, 28 and when the four slots 21, 22, 27, 28 of the inner and outer cylinders are in registry, the shutter opening is at its maximum. However, as the inner cylinder 26 is angularly displaced relative to the outer cylinder 13, the shutter opening is reduced. (Compare FIG. 6 opening with FIGS. 4 and 5.) One means for moving the inner cylinder relative to the outer is illustrated and described. Thus a helical groove 31 is formed in inner cylinder 26 and an axial slot 32 formed in outer cylinder 13. Pin 33 projects from the exterior into both slots. By moving pin 33 parallel to the axis of rotation of the cylinder the two cylinders are angularly displaced relative to each other about the axis of rotation, thereby accomplishing the opening and closing of the shutter. One means for moving pin 33 is a ring 34 which receives pin 33, the ring being moveable in an axial direction by means of clevis 37 on screw 38 which projects through casing 19. Knob 39 on screw 38 on the outside of casing 19 is used to move collar 34 longitudinally of cylinder 13 and may be provided with scale indications so that the aperture opening may be read. Adjustment is held by lock 40.

It will be noted that the first cylinder 13 carries on its exterior pairs of sprocket pins 41, 42 (one pin of each pair on each side of the film 11) which project outwardly and are located adjacent the leading edges of slits 21, 22, respectively. Film 11 is held in the vicinity of the shutter by means of backing plate 46 on the same side as the shutter and having aperture 45 and aperture plate 48 (having gate 52) on the opposite side of the film in a substantially flat plane (see FIG. 4). As the cylinder 13 rotates each sprocket pin 41, 42 enters one of the sprocket holes 12 in film 11 and pulls the film (while the shutter is closed) the distance of one frame (FIG. 5) and then disengages the sprocket hole (FIG. 6). The length of the sprocket pins 41, 42 is such that it fits into and disengages the sprocket hole 12 for a sufficient angular distance so that the chordal movement is sufficient to advance one film frame. The geometry for such movement is relatively simple.

To facilitate such precise movement of the film, rails 47, are located along opposite sides of either edge of the film adjacent the shutter. Pressure plate 48 is biased toward the film by springs 49. Plates 46 and 48 are provided with longitudinal grooves 50, 51 through which the sprocket pins 41, 42 may extend. Aperture 45 and film gate 52 have the shape of one frame cut in plates 46, 48. Hence the film 11 is held in a flat plane by the guides 47 adjacent gate 52 and the sprocket pins 41, 42 may extend at will through the plane and through the sprocket holes 12 in the film. It will be understood that in conventional films of the wider type sprocket holes 12 are located on each edge of the film. However, on narrower films only one side carries sprocket holes. The present invention may be modified to accommodate either arrangement.

FIG. 1 illustrates the application of the foregoing principles to a motion picture projector. Corresponding parts of the shutter and film advance bear reference numerals corresponding to FIGS. 3 to 6. Thus within the casing 19 there is provided a motor 56 which may be an electric motor, a spring-wound motor, or which may be manually actuated. On motor 56 is a pinion 57 which meshes with the main gear 58 of the mechanism. Main gear 58 meshes with gear 59 on shaft 17 so that cylinders 13, 26 rotate when motor 56 is operating. Main gear 58 also drives associated mechanism in the projector. Thus gear 61 which meshes with gear 58 carries pulley 62 which is connected by belt 63 to pulley 64 on feed reel 66. Film 11 is initially wound on reel 66 and is fed off of reel 66 as the same revolves. In order to maintain a free film feed loop 67 in advance of gate 52, there is provided a film feed sprocket 68 which has teeth fitting into the sprocket holes on the film and is held in position by pressure engagement with feed keeper roller 69. Sprocket 68 is fixed for rotation with gear 71 which also meshes with gear 58. In order to provide a film takeup loop 70 on the opposite side of the film gate 52 is a film takeup sprocket 72 having a film takeup keeper roller 73 in pressure contact therewith. Sprocket 72 is fixed to gear 74 which likewise meshes with gear 58. Another gear 76 carrying pulley 77 meshes with gear 58. Pulley 77 is connected by means of belt 78 to pulley 79 on film takeup reel 81. Thus the feed of the film from the feed reel 66 to the takeup reel 81 is in accordance with well recognized principles of projector construction except for the intermittent film advance which has heretofore been described.

The other elements of the projector are likewise conventional. Thus there is a light source 82 such as an arc or bulb positioned in a reflector 83 which projects the light through the conventional condenser lens system 84 and thus to the shutter. On the opposite side of the shutter is a projection lens 86 of conventional construction.

The operation of the projector is therefore as follows:

Film 11 is continuously fed off of the feed reel 66 at a uniform rate. The compensation for variations in the effective diameter in the amount of film on the reel by means of slip clutches and the like is not illustrated, such construction being conventional. A free film loop 67 is created between sprocket 71 and film gate 52 to smooth over the transition from continuous to intermittent motion of the film. Likewise, a lower free film loop 70 is created by sprocket 72 below the film gate. Film 11 is also fed onto the takeup reel 81, there being compensation for the variations in diameter of the film as in the case of the feed reel. Light is directed from a source 82 from lenses 84 toward shutter, which in this instance has a single cylinder 13 and no cylinder 26. When the slots 21, 22 in cylinder 13 are horizontal as viewed in FIGS. 4 to 6, the light passes through the slots in registry and then through the particular frame of film 11 being displayed and through the projecting lens system 86. As the cylinder 13 turns the light from the condenser lenses 84 is cut off from the film and a sprocket pin 41 or 42 then moves into engagement with one of the sprocket holes 12 in the film 11 and pulls the film 11 the distance of one frame. Thereupon the second horizontal alignment of the slots 21, 22 occurs and a second frame is projected through lens 86 onto viewing screen (not shown).

Figure 2:
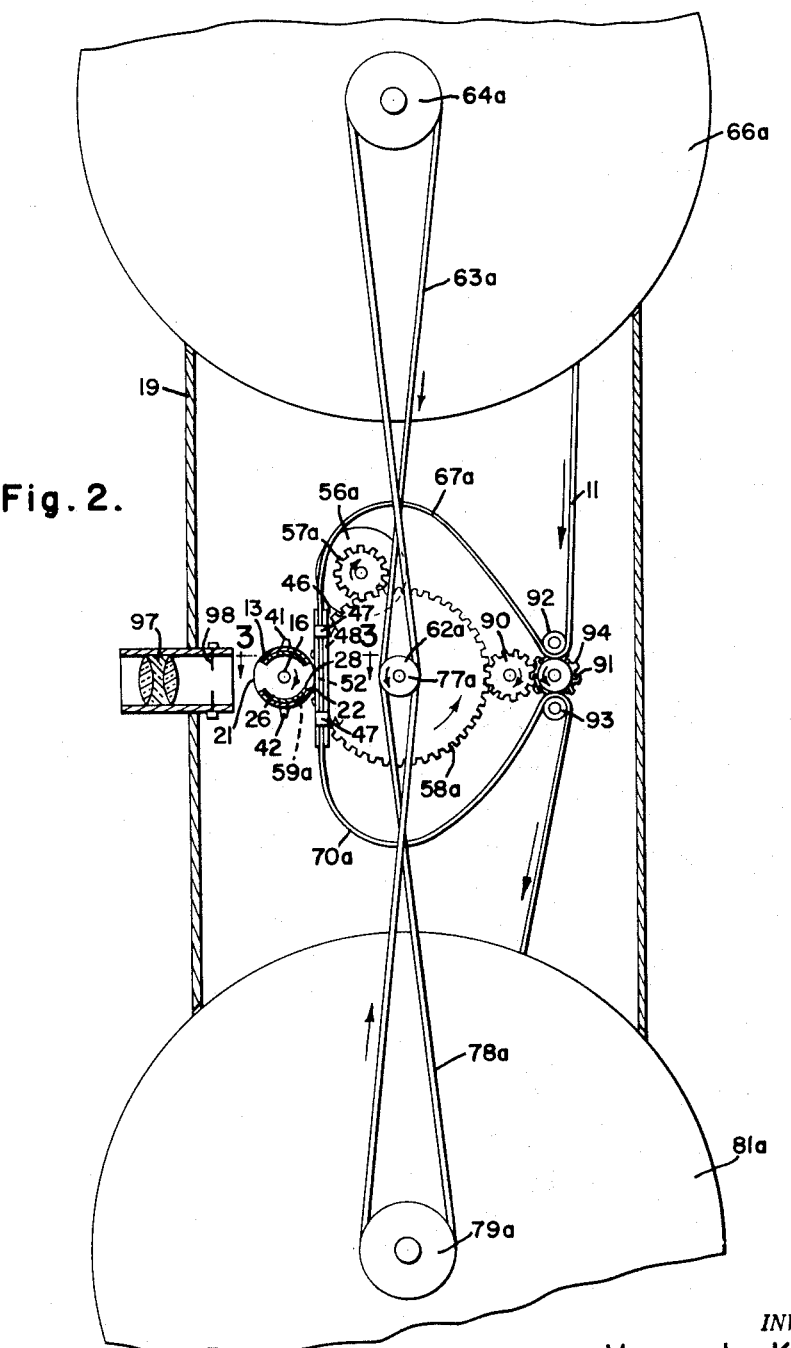
FIG. 2 is a view similar to FIG. 1 of a camera.

In FIG. 2, application of the invention to a camera is illustrated. In this system motor 56a has a pinion 57a which drives main gear 58a. Main gear 58a carries pulleys 62a, 77a which are connected by belts 63a, 78a, to pulleys 64a, 79a on film feed and take-up magazines 66a, 81a, respectively. A film feed loop 67a is controlled by means of sprocket 91 which engages both the film being fed and the film being taken up and is held in engagement therewith by pressure actuated feed and takeup rollers 92, 93, respectively. Sprocket 91 is mounted on gear 94 which meshes with main gear 58a through idler 90.

The shutter and film advance system is located on the opposite side of the film from that shown in the preceding or projector modification. Both cylinders 13 and 26 are used for controlling shutter speed and to effect fade-in and fade-out. Cylinders 13, 26 are rotatable with gear 59 on shaft 17 which in turn meshes with main gear 58a. Corresponding parts of the shutter and film advance mechanism bear corresponding reference numerals as in FIGS. 3 to 6. On the exterior of the camera casing 19, a lens 97 and an iris adjustment 98 are provided.

The operation of the system of FIG. 2 is relatively simple. Thus film is unwound from reel 66a as motor 56a revolves. Film is fed into the feed loop 67a at a uniform rate by means of sprocket 91 and threaded through plates 46, 48 and rails 47, 50. After passing film gate 52 the film runs through takeup loop 70a thence is fed at a uniform rate by means of sprocket 91 onto the takeup reel 81a which is wound by means of belt 78a. When the slot apertures 21, 22, 27, 28 in the cylinders 13, 26 are in alignment with the lens 97 and the film, one frame of the film is exposed. As soon as the angular position of the cylinders 13, 26 is such that light is cut off, sprocket 41 or 42 on cylinder 13 fits into one of the sprocket holes 12 on film 11 and advances the film 11 one frame whereupon the operation is repeated. Here again the means whereby the shutter opening may be varied is as heretofore explained.

In FIGS. 7 and 8, the invention is illustrated schematically in an alternate construction for a focal plane shutter. A continuous belt shutter curtain 101 travels around top and bottom rollers 102, 103, one of which is mechanically or manually driven and also around spacer rollers 102a and 103a. Curtain 101 has two transparent apertures 104 and 105 and light-impervious portions 106 and 106a. It also carries sprocket pins 107, 108 on impervious portions 106, 106a, respectively, and behind apertures 104, 105 in the normal direction of rotation of curtain 101. Pins 107, 108 enter sprocket holes 12b of film 11b to advance the film one frame for each cycle of the curtain. Apertures 104, 105 are so situated that during exposure of the film (in a camera) an uninterrupted path is provided through the curtain 101 for exposure of one frame of film. After exposure the impervious portion 106 interrupts light so that pins 107 advance film 11b one frame.

Although the foregoing invention has been described in some detail, by way of illustration and example for purposes of clarity of understanding, it is understood that certain changes and modifications may be practiced within the spirit of the invention and scope of the appended claims.

What is claimed is:

1. In photographic apparatus, guide means for confining a web of film to a fixed path of travel, a light source for said film, and shutter means adjacent said fixed path of travel interposed between said light source and the film traversing said guide means, said shutter means comprising a moveable member having at least one light impervious portion and at least one light transmitting portion and having at least first and second positions of movement, said shutter means in said first position having said light transmitting portion aligned between said light source and said film to transmit light to said film, said shutter means in said second position having said light impervious portion interposed between said light source and said film, said shutter means being adjustable as to the relative extent of the light transmitting and light impervious portions, means for advancing said shutter means between said first and second positions, at least one sprocket tooth on said movable member engageable with sprocket holes formed in said film and positioned to advance said film along said guide means when said shutter means is in second poistion, and reversible means for adjusting the relative extent of said light impervious portion and said light transmitting portion of said shutter means independent of said means for advancing said shutter means.

2. In photographic apparatus, a casing, guide means in said casing for confining a web of film to a fixed path of travel, first means establishing a light source on one side of said film, a cylinder in said casing rotatable about its principal axis adjacent and transverse to said path of travel between said film and said first means, said cylinder having a pair of diametrically opposed light transmitting windows and light-impervious portions between said windows, whereby light is transmitted from said light source when and only when said windows are aligned between said light source and said film, said cylinder formed with an axial slot, second means for rotating said cylinder, at least one sprocket tooth extending out from a light impervious portion of said cylinder and engageable with said film to advance said film along said guide means, a second cylinder inside said first-mentioned cylinder, said second cylinder having a pair of diametrically opposed second windows and second light impervious portions between said second windows, said second cylinder formed with a helical groove, said second means rotating said first-mentioned cylinder and said second cylinder together, and third means for shifting said cylinders relative to each other about their common axis of rotation, said third means comprising a pin projecting through said slot in said first-mentioned cylinder to said groove on said second cylinder such that axial movement of said pin causes an angular displacement between said first and second cylinders and opening and closing of said light transmitting windows, and means for moving said pin axially.

3. Apparatus according to claim 2, in which said first means is partially within and partially without said casing and said cylinder is inside said casing relatve to said light source.

4. Apparatus according to claim 2, in which said first means is inside said casing and said cylinder is between said film and said casing.

5. In combination, a casing, a lens system on said casing, a light source, means for storing, feeding and taking up film, shutter means having an opening and an impervious portion for interrupting communication between said light source and said film and having integral means for intermittently advancing said film when said communication is interrupted, drive means for moving said shutter means, and reversible means in said shutter means for changing the extent of said opening independent of said drive means.

6. In combination, a casing, a light source, guide means for film in said casing, a shutter in said casing between said light source and said guide means having a continuous surface and said surface having a light transmitting window and a light impervious area, film engaging means on said light impervious area, means for moving said shutter whereby said window intermittently establishes communication between said light source and film in said guide means and said film engaging means advances film along said guide means when said light impervious area cuts off communication between said light source and said film and reversible means for increasing or decreasing the effective opening of said window independent of said means for moving said shutter.

References Cited in the file of this patent

UNITED STATES PATENTS

| 1,911,134 | Wienke | May 23, 1933 |
| 1,997,642 | Klein | Apr. 16, 1935 |

FOREIGN PATENTS

| 65,412 | Austria | June 25, 1914 |
| 458,939 | Great Britain | Dec. 30, 1936 |